United States Patent Office 3,485,670
Patented Dec. 23, 1969

3,485,670
PROCESSES FOR CLEANING APPARATUS
USED IN PROCESSING POLY(ETHYLENE-
TEREPHTHALATE)
Joseph T. Fisher, Rochester, N.Y., assignor to Eastman
Kodak Company, Rochester, N.Y., a corporation of
New Jersey
No Drawing. Filed July 28, 1966, Ser. No. 568,379
Int. Cl. B08b 3/04
U.S. Cl. 134—5                                 8 Claims

ABSTRACT OF THE DISCLOSURE

A "post" treatment of apparatus such as filters that have been used to process poly(ethylene terephthalate), which "post" treatment involves subjecting the apparatus to the following steps [after substantially all of the poly-(ethylene terephthalate) has already been removed therefrom]:
(a) Heating said apparatus for at least about 2 hours at a temperature of from about 400° F. to about 700° F. in an oxygen-containing atmosphere; and
(b) Then washing said apparatus for at least about ½ hour at a temperature of at least about 90° C. in an aqueous alkali solution having a pH of at least about 10; results in substantially cleaner equipment.

---

The present invention relates to improved thermolytic processes for removing unwanted residues of poly(ethyleneterephthalate) and related metallic catalysts from screens which have been used in processing the poly-(ethyleneterephthalate).

The industrial applications of poly(ethyleneterephthalate) have become increasingly important during recent years with the consequent development of methods and apparatus for processing poly(ethyleneterephthalate) in larger and larger amounts. During the commercial processing of poly(ethyleneterephthalate) the problems associated with keeping the apparatus clean have been quite extensive. Several methods have been used from time to time in an effort to remove unwanted residues of poly-(ethyleneterephthalate) from various parts of the apparatus employed in making, transferring, extruding, and otherwise processing poly(ethyleneterephthalate). Especially difficult problems have been associated with the cleaning of pipes and filters through which the poly(ethyleneterephthalate) is transmitted. Joints in the pipes and the interstices of the filters provide especially difficult regions where accumulation of unwanted residues becomes a serious problem.

Filters used in transmitting clean, pure poly(ethyleneterephthalate) have been especially difficult to clean after they have become clogged. The cleaning of these filters has generally been accomplished by means of high boiling organic compounds which exert both solvent effects and melting effects upon the unwanted residues of poly(ethyleneterephthalate). Unfortunately, such a technique requires high temperatures if it is to include any melting effect. For example, the use of hot polyethylene glycol as a cleaning compound is fraught with a serious fire hazard and the use of this solvent compound requires considerable safety precautions in order to prevent fires from causing serious damage. Other solvents can be used such as chlorinated aromatic compounds, tri-phenyl phosphate, diethyl phthalate, and numerous other high boiling organic compounds known to exert solvent action against polyesters at high temperatures. Although the use of such solvent compounds usually accomplished an effective cleaning action, the expense of such solvents and the precautions involved and apparatus required in their use leave much to be desired.

An alternative cleaning medium which is easier to handle than the high boiling organic solvent compounds is a solution of alkali in a mixture of ethylene glycol and water. This alkaline solution is effective at relatively low temperatures such as 120°–130° C. but functions quite slowly so that the long period of time required makes it uneconomical. It can be made more economical by melting away some of the unwanted polyester residues from the filter surfaces or interior surfaces of the pipes of other apparatus. By so doing, the bulk of solidified unwanted residues of poly(ethyleneterephthalate) can be removed before subjecting the remainder of these residues to the alkaline solution. The melting operation also tends to cause some degradation of the remaining polyester residues so that they dissolve more readily in the alkaline solution.

Although the above and other methods have been used in removing unwanted residues, no simple method for accomplishing the desired objective was apparent prior to the time the invention described in detail in U.S. Patent 2,917,418 was developed. The invention of this patent represented a decided improvement in this art. For some strange reason even the invention of U.S. 2,917,418 was not a complete solution to the basic problem of completely cleaning the filter. Apparently some small amounts of material still remained on the filter screens, even after their treatment in accordance with the process of the aforementioned patent, which small amounts, if left on the screens, had a tendency to "build-up" over a period of time to extremely bothersome levels.

It has now been discovered that such "build-up" can be remedied by using a post-treatment (after the treatment in accordance with the processes described in U.S. 2,917,418) involving the steps of
(a) Heat-treating the filters for at least about 2 hours at a temperature of from about 400° F. to about 700° F. in an atmosphere that contains oxygen, and preferably also contains a small amount of moisture;
(b) Washing the filters in a hot aqueous solution of alkali for at least about ½ hour;
(c) Rinsing the filters with water (not a necessary step); and
(d) Drying the filters.

Since the present processes are essentially improvements based upon the processes detailed in the disclosure of U.S. 2,917,418, the disclosure of this patent is hereby incorporated by reference into the present disclosure. Generally, the processes of U.S. 2,917,418 involve two basic approaches. The first of these, for the removal of unwanted residues of poly(ethyleneterephthalate) from screens and other apparatus that has been used in processing poly(ethyleneterephthalate) by "a thermolytic method which broadly comprises (A) internally contacting said apparatus with a gas heated at from about 275° C. to about 350° C. until that portion of the unwanted residues of polyethylene telephthalate which will melt and flow into a removable location has been melted and removed from said apparatus, and then (B) internally contacting said apparatus with a gas heated at from about 325° to about 525° C. until the remaining unwanted residues of polyethylene telephthalate have been vaporized.

When the apparatus itself is also heated according to the preferred embodiments of this invention, it is essential that the apparatus temperature at all points above 300° C. be increased gradually at a rate not to exceed 50° C. per hour so as to avoid carbonaceous degradation.

The second basic approach described in U.S. 2,917,418 involves the cleaning of the apparatus in hot (>80° C.) glycol (such as ethylene glycol, diethylene glycol, triethylene glycol, and the like). Such a hot glycol wash is generally conducted for several hours (from about 2 to about 20 or more) to remove essentially all of the poly(ethyleneterephthalate), and is an alternative to the "thermolytic" procedure described above. Either (or both) of these processes serves well as a preliminary to the improved processes of the present invention.

The heating step ("step (a)" above) of these processes must be done in an atmosphere that contains some oxygen. Thus, it can be relatively pure oxygen, air, or any number of gases that have been intermixed with air or oxygen. Preferably, the atmosphere (during the heating step) should also contain at least a small amount of moisture or water vapor. Very small amounts of water vapor, for example, enough to have a relative vapor pressure of at least about 5 mm. Hg in the hot atmosphere, are satisfactory, although larger amounts can also be used. Temperatures during this heating step must range between about 400° F. and about 700° F. (preferably between about 500° F. and about 650° F.) for at least about 2 hours (preferably between about 4 and about 8 hours). Such conditions can readily be obtained in many conventional circulating air ovens.

The term "alkali" in "step (b)," above, means any material that can be dissolved in water to a level of at least about 0.5 weight percent and can impart, at the 0.5 weight percent level and at 25° C., a pH to the resulting aqueous solution of at least about 10. Thus, the term "alkali" can include both organic and inorganic water-soluble bases such as pyridene, certain quaternary ammonium hydroxides, alkali metal hydroxides and oxides, trialkali metal phosphate, and the like. Preferably one or more alkali metal hydroxides such as NaOH and KOH should be used in this "aqueous alkaline wash" step. In these solutions, any amount (up to the solubility limit of the alkali) of alkali can be used, so long as the pH of the "aqueous alkali solution" is at least about 10. Generally, when NaOH or KOH is used, particularly useful amounts range from about 0.5 to about 30 weight percent of alkali dissolved in the water. The temperature of the hot aqueous alkali should be at least about 90° C. (preferably between about 100° C. and about 200° C.) during this "step (b)" of the present processes.

EXAMPLE

Filter units that have been used in the filtration of molten poly(ethyleneterephthalate) for a period of several months, and which have been twice subjected to the following sequence of steps (as taught in U.S. 2,917,418) is found to have a "pressure drop" of 0.368 inch (of water) across the screen.

Cleaning cycle:
(1) Heat filter units for about 6 hours in hot (500° F.) triethylene glycol.
(2) Cool the filters and rinse with water.
(3) Boil for two hours in boiling 20% NaOH solution.
(4) Rinse with water and dry.

Continued use of this screen in this conventional usage-cleaning sequence results in continued build-up of some deposits on the screen that apparently cannot be removed via subsequent similar treatments.

Treatment of the treated filters, described above, in the following sequence of steps (in accordance with the present invention), results in the reduction of the "pressure drop" to only 0.213 inch (of water).

Improved sequence:

(5) Heat the filters in an oven maintained at about 600° F. for about 6 hours. The atmosphere in the oven is heated ambient air containing a small amount of moisture.
(6) Boil the filters in a 20 weight percent aqueous solution of NaOH for 4 hours.
(7) Rince with water.
(8) Rinse with methyl alcohol.
(9) Cool and dry.

Continued use of this sequence after the initial use of the process described in steps (1)–(4) of this example results in essentially no "pressure drop" over an extended series (eight or more) of use-cleaning sequences or cycles.

What is claimed is:
1. In a process for removing unwanted residues of poly(ethylene terephthalate) and catalysts therefore from apparatus that has been used in processing poly(ethylene terephthalate), which process comprises initially soaking said apparatus in hot glycol for at least about 2 hours, whereby substantialy all of said poly(ethylene terephthalate) is removed from said apparatus; the improvement which comprises subsequently
   (a) heating said apparatus for at least about 2 hours at a temperature of from about 400° F. to about 700° F. in an oxygen-containing atmosphere; and
   (b) then washing said apparatus for at least about ½ hour at a temperature of at least about 90° C. in an aqueous alkali solution having a pH of at least about 10.

2. An improved process as in claim 1, wherein said glycol is selected from the group consisting of ethylene glycol, diethylene glycol, and triethylene glycol, and said aqueous alkali solution contains, dissolved therein, at least about 0.5 weight percent of an alkali metal hydroxide.

3. An improved process as in claim 2, wherein said glycol is triethylene glycol and said alkali metal hydroxide is NaOH or KOH.

4. In a process for removing unwanted residues of poly(ethyleneterephthalate) and metallic catalyst residues from apparatus that has been used in processing poly(ethyleneterephthalate), which process comprises initially contacting said apparatus with boiling triethylene glycol for from about 2 to about 20 hours to thereby remove said residues of poly(ethyleneterephthalate) from said apparatus; the improvement which comprises subsequently
   (a) heating said apparatus in moist air for at least about 2 hours at a temperature between about 500° F. and about 650° F.;
   (b) then washing said apparatus for at least about ½ hour at a temperature between about 100° C. and about 200° C. with an aqueous solution of an alkali metal hydroxide having a pH of at least about 10.

5. An improved process as in claim 4, wherein said alkali metal hydroxide is either NaOH or KOH, and the concentration of said alkali metal hydroxide in said aqueous solution is at least about 0.5 weight percent.

6. In a process for removing unwanted residues of poly(ethylene terephthalate) and catalysts therefor from apparatus that has been used in processing poly(ethylene terephthalate), which process comprises (A) internally contacting said apparatus with a gas heated at from about 275° C. to about 350° C. until that portion of the unwanted residues of poly(ethylene terephthalate) which will melt and flow into a removable location has been melted and removed from said apparatus, and then (B) internally contacting said apparatus with a gas heated at from about 325° to about 525° C. until the remaining unwanted residues of poly(ethylene terephthalate) have been vaporized, wherein during said internal contact with the heated gas said apparatus is also externally heated at an apparatus temperature not substantially greater than 325° C. during step (A) and not substantially greater than 525° C. during step (B), said apparatus temperatures being achieved at all points above 300° C. at a gradual rate not to exceed 50° C. per hour; the improvement which comprises subsequently
  (a) heating said apparatus for at least about 2 hours at a temperature of from about 400° F. to about 700° F. in an oxygen-containing atmosphere; and
  (b) then washing said apparatus for at least about ½ hour at a temperature of at least about 90° C. in an aqueous alkali solution having a pH of at least about 10.

7. An improved process as in claim 6, wherein said aqueous alkali solution contains dissolved, therein, at least about 0.5 weight percent of an alkali metal hydroxide.

8. An improved process as in claim 7, wherein said alkali metal hydroxide is NaOH or KOH.

References Cited

UNITED STATES PATENTS

| 2,781,242 | 2/1957 | Knapp | 8—115.5 |
| 2,907,687 | 10/1959 | Scigliano | 134—5 |
| 2,917,418 | 12/1959 | Cathcart | 134—5 |

OTHER REFERENCES

Du Pont Technical Bulletin D–76, March 1956.

MORRIS O. WOLK, Primary Examiner

D. G. MILLMAN, Assistant Examiner

U.S. Cl. X.R.

134—2, 29, 30